(12) United States Patent
Tanaka et al.

(10) Patent No.: US 8,297,814 B2
(45) Date of Patent: Oct. 30, 2012

(54) VEHICLE HEADLAMP

(75) Inventors: Hidetada Tanaka, Shizuoka (JP);
Satoshi Yamamura, Shizuoka (JP);
Motohiro Komatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 174 days.

(21) Appl. No.: 12/967,189

(22) Filed: Dec. 14, 2010

(65) Prior Publication Data
US 2011/0141753 A1    Jun. 16, 2011

(30) Foreign Application Priority Data

Dec. 16, 2009   (JP) ................................. 2009-285497

(51) Int. Cl.
| | |
|---|---|
| B60B 1/00 | (2006.01) |
| F21V 11/00 | (2006.01) |
| F21V 29/00 | (2006.01) |
| F21V 17/02 | (2006.01) |
| F21S 8/10 | (2006.01) |

(52) U.S. Cl. ........ 362/539; 362/538; 362/543; 362/544; 362/512

(58) Field of Classification Search .......... 362/464–468, 362/506, 507, 512, 513, 538, 539, 543–545
See application file for complete search history.

(56) References Cited

U.S. PATENT DOCUMENTS

| | | | | |
|---|---|---|---|---|
| 7,341,366 | B2* | 3/2008 | Iwasaki | 362/538 |
| 7,510,310 | B2* | 3/2009 | Komatsu | 362/466 |
| 7,918,594 | B2* | 4/2011 | Watanabe et al. | 362/507 |
| 7,988,345 | B2* | 8/2011 | Rosenhahn et al. | 362/538 |
| 8,042,981 | B2* | 10/2011 | Kotajima et al. | 362/538 |
| 2007/0147055 | A1 | 6/2007 | Komatsu | |
| 2008/0112173 | A1* | 5/2008 | Dassanayake et al. | 362/466 |

FOREIGN PATENT DOCUMENTS

| | | |
|---|---|---|
| DE | 102008014182 A1 | 9/2009 |
| FR | 2787864 A1 | 6/2000 |
| JP | 2007-179969 A | 7/2007 |

OTHER PUBLICATIONS

Extended European Search Report issued on Apr. 18, 2011 in the corresponding European Patent Application No. 10194896.6.

* cited by examiner

*Primary Examiner* — David Crowe
(74) *Attorney, Agent, or Firm* — Sughrue Mion, PLLC (57) ABSTRACT

A vehicle headlamp includes a first light source configured to emit first light that is projected to form a first irradiation region, a second light source configured to emit second light that is projected to form a second irradiation region joined to the first irradiation region to extend in a transverse direction with respect to an optical axis, a movable shade configured to move between a position at which light irradiation to a joined region of the first irradiation region and the second irradiation region is shielded, and a position at which the light irradiation to the joined region is permitted, and a controller configured to select one of light distribution patterns that are determined by combinations of turning on and off of the first light source, turning on and off of the second light source, and the positions of the movable shade.

6 Claims, 11 Drawing Sheets

| CONDITIONS | LIGHT DISTRIBUTION PATTERNS |
|---|---|
| CONDITION 1<br>LIGHT SOURCE 14a: ON<br>LIGHT SOURCE 14b: ON<br>SHADING: OFF | 100b  100c  100a |
| CONDITION 2<br>LIGHT SOURCE 14a: ON<br>LIGHT SOURCE 14b: ON<br>SHADING: ON | 100b  102  100a |
| CONDITION 3<br>LIGHT SOURCE 14a: ON<br>LIGHT SOURCE 14b: OFF<br>SHADING: ON | 102  100a |
| CONDITION 4<br>LIGHT SOURCE 14a: ON<br>LIGHT SOURCE 14b: OFF<br>SHADING: OFF | 100a |
| CONDITION 5<br>LIGHT SOURCE 14a: OFF<br>LIGHT SOURCE 14b: ON<br>SHADING: ON | 100b  102 |
| CONDITION 6<br>LIGHT SOURCE 14a: OFF<br>LIGHT SOURCE 14b: ON<br>SHADING: OFF | 100b |

VEHICLE HEADLAMP

CROSS-REFERENCE TO RELATED APPLICATION

The present application claims priority from Japanese Patent Application No. 2009-285497 filed on Dec. 16, 2009, the entire content of which is incorporated herein by reference.

FIELD OF INVENTION

The present invention relates to a vehicle headlamp and more particularly to a structure of a vehicle headlamp that can vary a light distribution pattern.

DESCRIPTION OF RELATED ART

A vehicle headlamp of a light distribution variable type is configured to form a low beam by shielding light from a light source using a shade and a high beam by not shielding the light. According to a related art, the headlamp may be configured to form a light distribution pattern that is different from a standard low beam or a standard high beam, depending on surrounding conditions. Especially, in the case of a high beam, a glare to an oncoming vehicle or a pedestrian needs to be considered while improving a field of view of a driver.

In view of above, a vehicle lamp described in JP 2007-179969 A is configured to adjust an irradiation region of the high beam, depending on whether there is a pedestrian, a preceding vehicle or an oncoming vehicle. More specifically, the vehicle lamp includes three light sources to irradiate three difference regions, and the light sources are individually turn on and off to, for example, suppress the irradiation of a region where a pedestrian is present. The three light sources can be either all turned on, two of them turned on, one turned on, or all turned off to form light distribution patterns.

However, according to this configuration, a light source is provided for each region desired to be controlled on and off, which leads to an increase in a size of a housing, an increase in component cost, and a complex control. Further, the increase of the light sources causes an increase in required electric power.

BRIEF SUMMARY

Illustrative aspects of the present invention provide a vehicle headlamp having a simplified configuration in which the number of light sources while maintaining the same level of functionality.

According to an illustrative aspect of the present invention, a vehicle headlamp includes a projection lens, a first light source configured and arranged such that first light from the first light source is forwardly projected through the projection lens to form a first irradiation region, a second light source configured and arranged such that second light from the second light source is forwardly projected through the projection lens to form a second irradiation region, the first irradiation region and the second irradiation region being joined to extend in a transverse direction with respect to an optical axis of the vehicle headlamp, a movable shade configured to move between a position at which light irradiation to a joined region where the first irradiation region and the second irradiation region are joined is shielded, and a position at which the light irradiation to the joined region is permitted, and a controller configured to select one of light distribution patterns that are determined by combinations of turning on and off of the first light source, turning on and off of the second light source, and the positions of the movable shade.

Other aspects and advantages of the invention will be apparent from the following description, the drawings and the claims.

DETAILED DESCRIPTION

Hereinafter, exemplary embodiments of the present invention will be described in detail. However, the following exemplary embodiments do not limit the scope of the claimed invention.

Figure 1:
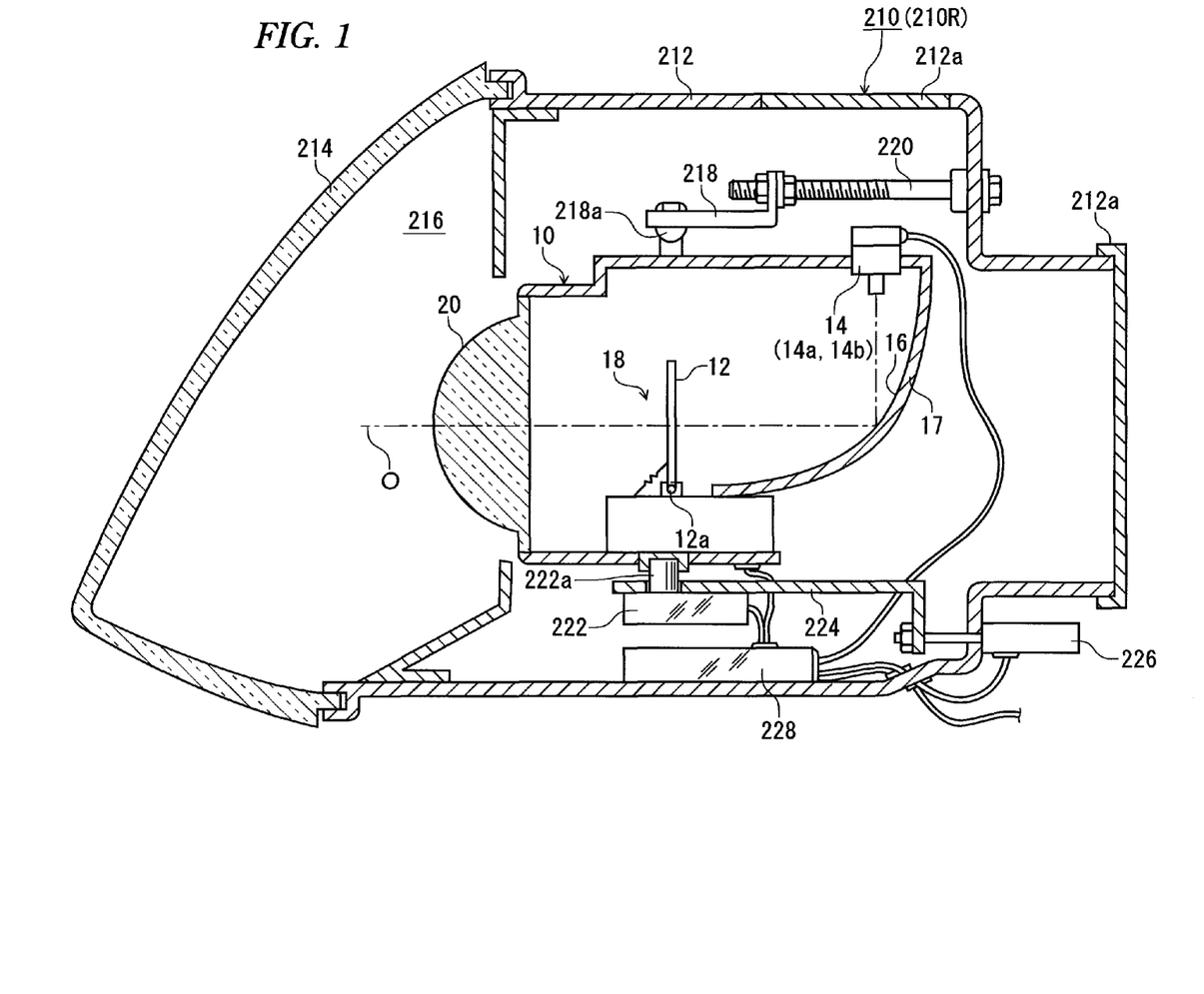
FIG. 1 is a schematic sectional view of a vehicle headlamp according to an exemplary embodiment of the present invention, illustrating an interior structure of the headlamp.

FIG. 1 is a schematic sectional view of a vehicle headlamp 210 according to an exemplary embodiment of the invention, illustrating an internal structure of the vehicle headlamp 210. The vehicle headlamp 210 is a high beam headlamp arranged on right and left portions of a front portion of the vehicle. The right headlamp and the left headlamp have basically the same structure. Therefore, the structure of the right headlamp 210R will be described in the following description. The high beam headlamp 210 forms a high beam light distribution pattern in combination with a low beam light distribution pattern formed by a separately arranged low beam headlamp.

The headlamp 210R includes a lamp body 212 and a transparent cover 214. The lamp body 212 has a opening portion on a front side and a detachable cover 212a on a rear side. The detachable cover 12a is detached during maintenance. The transparent cover 214 is attached to cover the opening portion the lamp body 212 to form a lamp chamber 216. In the lamp chamber 216, a lamp unit 10 is accommodated to send light to toward the front from the vehicle. The lamp unit 10 includes a lamp bracket 218 having a pivot mechanism 218a as a center of swiveling of the lamp unit 10. The lamp bracket 218 is screw connected to aiming adjust screws 220 which are rotatably supported on a wall of the lamp body 212. The lamp unit 10 is supported in position inside the lamp chamber 216 such that the lamp unit 10 can be tilted in accordance with an adjustment of the aiming adjust screws 220.

A rotating shaft 222a of a swivel actuator 222 is fixed to a lower surface of the lamp unit 10 so that the lamp unit 10 can be swiveled in a horizontal direction.

The swivel actuator 222 is fixed to a unit bracket 224. To the unit bracket 224, a leveling actuator 226 arranged outside the lamp body 212 is connected so that the lamp unit 10 can be tilted in the vertical direction.

On an inner wall surface of the lamp chamber 216, for example, below the lamp unit 10, an irradiation controller 228 is arranged to control turning on and off of the lamp unit 10 and the light distribution pattern to be formed. The irradiation controller 228 also controls the swivel actuator 222 and the leveling actuator 226. The irradiation controller 228 may be arranged outside the headlamp 210R. Further, the irradiation controller 228 may have only a function for relaying a control for turning on and off the lamp unit from the vehicle side.

Figure 2A:
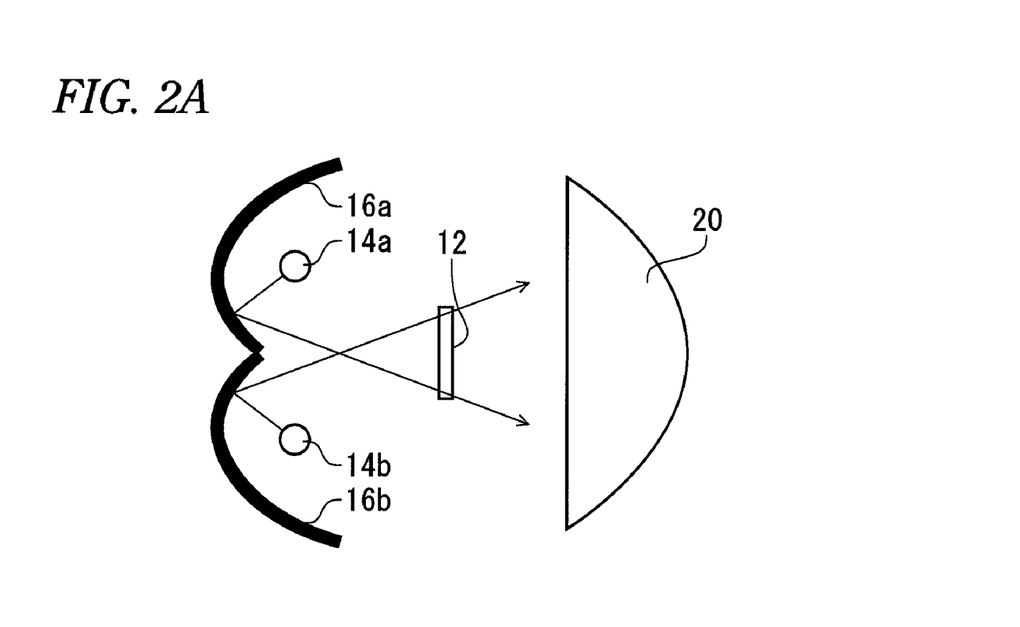
FIG. 2A is a diagram illustrating a positional relation between a first light source, a second light source and a movable shade of the headlamp.

The lamp unit 10 includes a shade mechanism 18 including a movable shade 12, a light source 14, a lighting tool housing 17 for supporting a reflector 16 on an inner surface and a projection lens 20. As the light source 14, for example, an incandescent bulb or a halogen lamp, a discharge bulb, an LED or the like may be used. In this exemplary embodiment, an example is shown in which the light source 14 is formed with the halogen lamp. The reflector 16 reflects light radiated from the light source 14. Then, the light reflected by the reflector 16 is partly guided to the projection lens 20 via the movable shade 12 forming the shade mechanism 18. As shown in FIG. 2, the lamp unit 10 of the present exemplary embodiment has two light sources 14a, 14b in the vehicle width direction and the light sources 14a, 14b are respectively controlled to be turned on and off by the irradiation controller 228.

The movable shade 12 is configured to rotate about a rotating shaft 12a so as to move to a position where a part of the light from the light source 14 is shielded (an advanced position) and a position where the part of the light is not shielded (a retracted position). FIG. 1 shows a state in which the movable shade 12 is in the advanced position. The shade mechanism 18 includes an actuator for rotating the movable shade 12. Further, the movable shade 12 is provided with an urging member for returning the movable shade to a retracted position against a movement to, for example, the advanced position by the actuator. In FIG. 1, a spring is exemplified as the urging member. The movable shade 12 may move, for example, in a vertical direction to move between the retracted position and the advanced position.

FIG. 1 shows an example that the high beam headlamp 210 includes an aiming mechanism or a leveling mechanism, however, the aiming mechanism or the leveling mechanism may be omitted. For example, the high beam headlamp 210 may be formed integrally with low beam headlamp. In this case, the aiming mechanism or the leveling mechanism may be provided either in the high beam headlamp or in the low beam headlamp, or in a base member on which both the headlamps are mounted. Then, an aiming adjustment or a leveling adjustment may be carried out at the same time in both the headlamps for the vehicle.

Figure 2B:
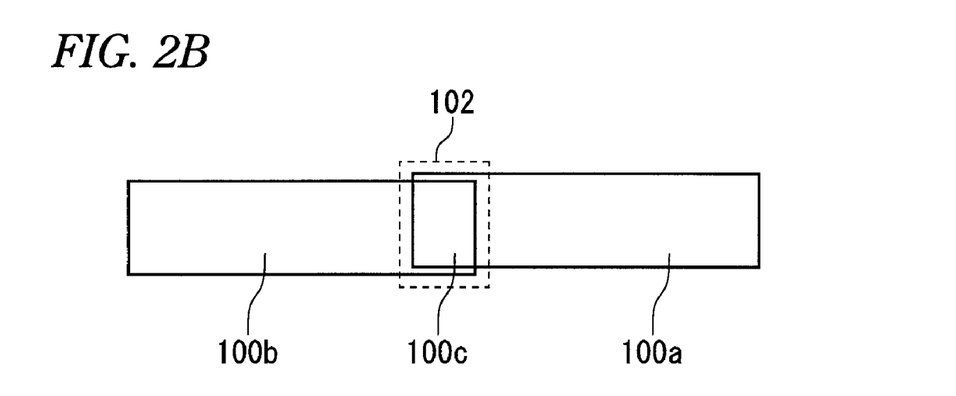
FIG. 2B is a diagram illustrating a light distribution pattern formed by the first light source, the second light source and the movable shade.

FIGS. 2A and 2B illustrate a positional relation between the first light source 14a, the second light source 14b and the movable shade 12 of the vehicle headlamp 210, and the resulting light distribution pattern. As shown in FIG. 2A, the high beam headlamp 210 has two light sources, the light source 14a functioning as the first light source configured and arranged such that first light from the first light source is projected through the projection lens 20 toward the front of the vehicle to form a first elongated irradiation region 100a, and the light source 14b functioning as the second light source configured and arranged such that second light from the second light source is projected through the projection lens 20 toward the front of the vehicle to form a second elongated irradiation region 100b. As shown in FIG. 2B, the first irradiation region 100a and the second irradiation region 100b extend in the vehicle width direction. The light source 14a is formed so that the form itself corresponds to an elongated light distribution pattern shown in FIG. 2B or a form corresponding to the elongated light distribution pattern is provided by adjusting the reflection by a reflector 16a and the light is guided toward the projection lens 20. The light source 14b is formed in the same way as described above. The reflectors 16a, 16b are respectively formed on the basis of, for example, paraboloid of revolution.

According to the exemplary embodiment, the second irradiation region 100b is joined to the first irradiation region 100a to extend in the transverse direction with respect to an optical axis O of the headlamp 210 (see FIG. 1). FIG. 2B shows an example that an end portion of the first irradiation region 100a and an end portion of the second irradiation region 100b are overlapped on each other to form an overlapping region 100c. The overlapping region 100c can be adjusted, for example, by adjusting the arrangements of the light sources 14a, 14b respectively or adjusting the forms of the reflectors 16a, 16b. As described above, the first irradiation region 100a and the second irradiation region 100b are overlapped on each other in a joined region. Thus, when the high beam is formed, the light is superimposed in the vicinity of a central part, so that a luminous intensity can be improved and a visibility can be improved during the use of the high beam.

The end portion of the first irradiation region 100a and the end portion of the second irradiation region 100b may not overlap on each other, and the end portion of the first irradiation region 100a and the end portion of the second irradiation region 100b may be joined such that they share the same boundary. That is, according to the exemplary embodiment, the joined region includes a case where the end portions are joined in an overlapping manner and a case where the end portions are joined such that they share the same boundary. In FIG. 2B, in order to explain that the end portion of the first irradiation region 100a is overlapped on the end portion of the second irradiation region 100b, the first irradiation region 100a and the second irradiation region 100b are shown in an state that the irradiation regions 100a and 100b are shifted vertically from each other. However, the irradiation regions 100a and 100b are actually arranged without a vertical shift.

The movable shade 12 can be moved by the shade mechanism 18 to a position at which the light irradiation to the joined region where the first irradiation region 100a and the second irradiation region 100b are joined is shielded and a position at which the light irradiation to the joined region is permitted. In FIG. 2B, the light shielded region 102 is shown by a broken line. According to the exemplary embodiment, the size and the moving positions of the movable shade 12 are determined so that the light shielded region 102 is wider than the overlapping region 100c so as to completely cover the overlapping region 100c. The width of the light shielded region 102 may the same as the width of the overlapping region 100c. However, when the light shielded region 102 is narrower than the overlapping region 100c, if the light is shielded by the movable shade 12, a bright part is undesirably left where the light is overlapped adjacently to the light shielded region 102.

Figure 3:
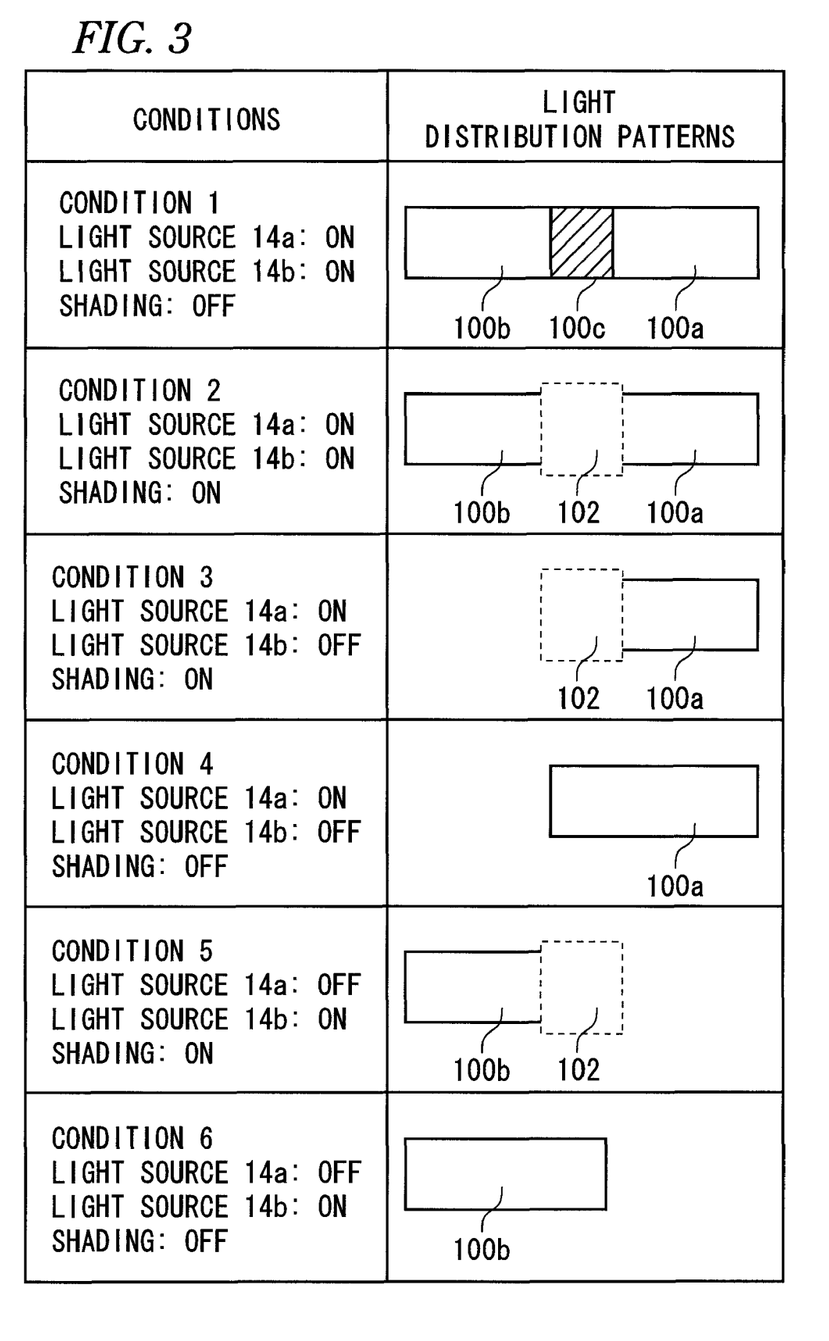
FIG. 3 is a diagram illustrating examples of light distribution patterns formed by controlling the first light source, the second light source and the movable shade.

As described above, according to the exemplary embodiment, the light distribution pattern can be formed that is substantially the same as a case that three areas are turned on and off by switching turning on and off operations of the two light sources and a light shield/non-light shield by the movable shade 12 to control the three light sources to be turned on and off. FIG. 3 shows image examples of control conditions of the vehicle headlamp 210 and formed light distribution patterns. The light distribution patterns shown in FIG. 3 only illustrate light distribution patterns formed by the high beam headlamp 210. Actually, the light distribution patterns are combined with the light distribution patterns for the low beam separately formed by the low beam headlamp to form the high beams as a whole. Further, the form of the actual high beam shows a mountain shape sloping down from a central part towards the respective sides, however, in FIG. 3, the form of the high beam is shown as a rectangular shape for the purpose of simplification.

In accordance with the control of the irradiation controller 228, a condition 1 is obtained in which the light sources 14a, 14b are controlled to be turned on and the movable shade 12 is controlled to be in the non-light-shielding condition. Thus, the first irradiation region 100a and the second irradiation region 100b including the overlapping region 100c are turned on. This state is a complete high beam irradiation state which can realize the same light distribution pattern as that obtained when the three light sources are used to turn on the three areas by turning on the two light sources. Further, since the overlapping region 100c is formed, the luminous intensity can be improved in the vicinity of the central part.

Further, in accordance with the control of the irradiation controller 228, a condition 2 is obtained in which the light sources 14a, 14b are controlled to be turned on and the movable shade 12 is controlled to be in the light-shielding condition. Thus, the overlapping region 100c is shaded by the light shielded region 102 and a portion of the first irradiation region 100a and a portion of the second irradiation region 100b are irradiated. This state is a high beam irradiation state with a central area shaded which realizes the same light distribution pattern as that obtained when only two right and left light sources are turned on in a structure that controls the three areas by using the three light sources. The high beam irradiation state with the central area shaded is an effective light distribution pattern to prevent a glare from being given to an oncoming vehicle or preceding vehicle far in front, for example, when a preceding vehicle, an oncoming vehicle, or a pedestrian is not present near in front, however, the oncoming vehicle or the preceding vehicle is present far in front.

In accordance with the control of the irradiation controller 228, a condition 3 is obtained in which only the light source 14a is controlled to be turned on and the movable shade 12 is controlled to be in the light-shielding condition. Thus, a central area of the high beam corresponding to the overlapping region 100c is shaded by the light shielded region 102 and a portion of the first irradiation region 100a is irradiated. This state is a high beam irradiation state of only an opposing lane side with the central area shaded which realizes the same light distribution pattern as that obtained when only a right side is turned on in a structure that controls the three areas by using the three light sources. The right side high beam irradiation state is an effective light distribution pattern to prevent a glare from being given to, for example, a preceding vehicle present near in front or a preceding vehicle present far in front and to improve a field of view of an area where an oncoming vehicle or a pedestrian is not present near in front on the opposing lane.

In accordance with the control of the irradiation controller 228, a condition 4 is obtained in which only the light source 14a is controlled to be turned on and the movable shade 12 is controlled to be in the non-light-shielding condition. Thus, the first irradiation region 100a including the central area of the high beam corresponding to the overlapping region 100c is turned on. This state is a high beam irradiation state of the central area and the opposing lane side which realizes the same light distribution pattern as that obtained when central and right light sources are turned on in a structure that controls the three areas by using the three light sources. The right side high beam irradiation state is an effective light distribution pattern to prevent a glare from being given to, for example, a preceding vehicle present near in front and to improve a field of view of an area where a preceding vehicle or an oncoming vehicle is not present far in front and an oncoming vehicle or a pedestrian is not present near in front.

In a conditions 5 and 6 that the light source 14a is turned off and only the light source 14b is turned on and the moving state of the movable shade 12 is controlled, the irradiation region becomes the opposite to that of the conditions 3 and 4 with respect to the opposing lane and the self lane. The condition 5 provides an effective light distribution pattern when a glare is prevented from being given to an oncoming vehicle or a pedestrian present in a relatively near position on the opposing lane and a preceding vehicle or an oncoming vehicle present in a front and remote position and when a preceding vehicle is not present near in front. Further, the condition 6 provides an effective light distribution pattern when a glare is prevented from being given to an oncoming vehicle or a pedestrian present in a front and relatively near position on the opposing lane and when a preceding vehicle or an oncoming vehicle is not present in front.

As described above, according to the exemplary embodiment, the turning on and off operations of the light source 14a and the light source 14b are combined with the moving operations of the movable shade 12 to form a plurality of kinds of light distribution patterns. That is, the two light sources can form the light distribution patterns substantially the same as those formed when three light sources are provided. By reducing the number of the light sources in this way, the vehicle headlamp 210 can be made compact, component cost can be reduced, and a control for turning on and off the light sources can be simplified. Further, the decrease of the number of the light sources can contribute to a reduction of a required electric power. When the three light sources are used, only a central light source can be turned on, however, according to the configuration of this exemplary embodiment, a turning on operation of only the central part cannot be realized. However, a frequency of use of the high beam for turning on only the central part is low. Thus, even when only the central part cannot be turned on, a problem rarely occurs in practice.

When the movable shade 12 is provided as in the high beam headlamp 210 of the present exemplary embodiment, a side surface different from a light shield surface of the movable shade 12 can be effectively used. For example, the side surface of the movable shade 12 may used as a reflecting surface, so that light reflected thereon is superimposed on the irradiation region of light which are not shielded and applied, whereby the luminous intensity of a portion of the light distribution pattern can be improved.

Figure 4A:
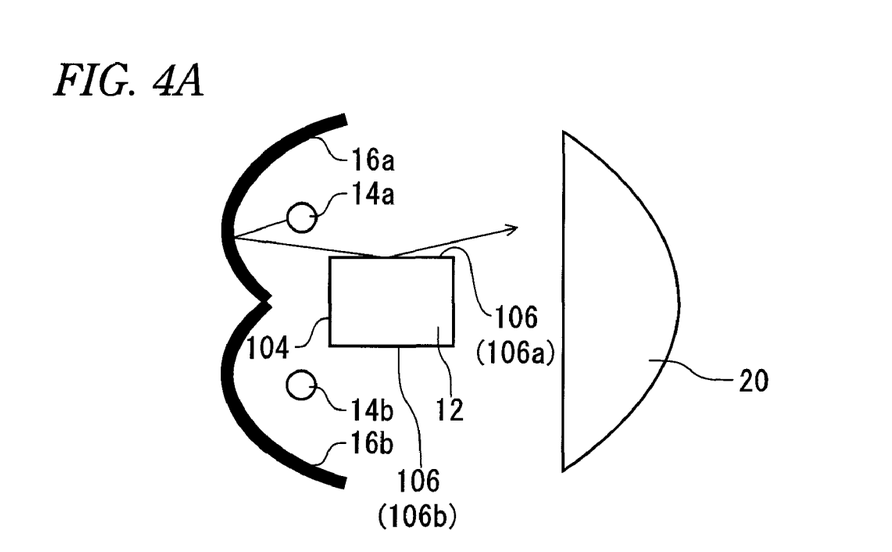
FIG. 4A is a diagram illustrating an example in which the movable shade has reflecting portions.
Figure 4B:
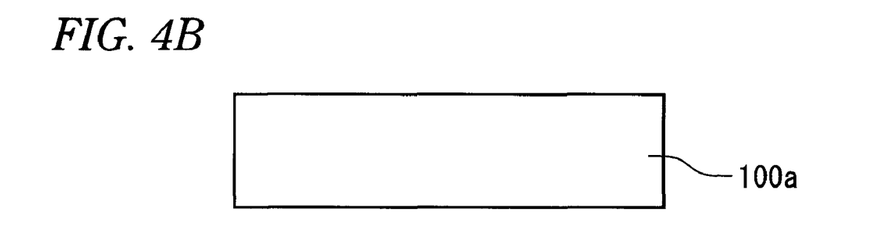
FIGS. 4B and 4C are diagrams illustrating how the light reflected by the reflected portion is superimposed.
Figure 4C:
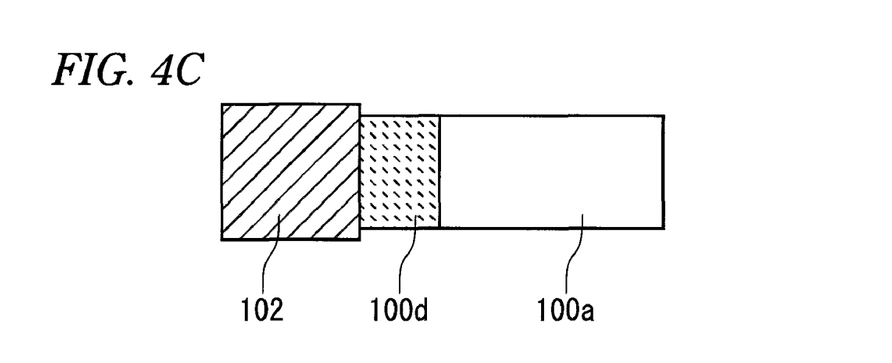

FIG. 4A to FIG. 4C illustrate an example in which the movable shade has reflecting portions and how the light is reflected superimposed. As shown in FIG. 4A, the movable shade 12 includes a light shielding portion 104 facing the light source 14 side and reflecting portions 106 on respective side surfaces. The reflecting portion 106 may be formed by, for example, attaching a reflecting member or coating. Further, the movable shade 12 itself may be formed as the reflecting member and a non-reflecting member may be attached or coated to form the light shielding portion 104. A surface of a reflecting portion 106a is formed so that the light incident on the reflecting portion 106a of the light source 14a side are guided to a given position in the first irradiation region 100a. Similarly, a surface of a reflecting portion 106b is formed so that the light incident on the reflecting portion 106b of the light source 14b side are guided to a given position in the second irradiation region 100a.

FIG. 4B illustrates the first irradiation region 100a formed when only the light source 14a is turned on and the movable shade 12 is in the non-light-shielding condition. FIG. 4C shows the first irradiation region 100a and the light shielded region 102 formed when only the light source 14a is turned on and the movable shade 12 is in the light shielding condition. In this case, the light reflected by the reflecting portion 106a is superimposed on a position of the first irradiation region 100a in the light shielded region 102 side to form a superimposed region 100d. For example, even when a portion of the light distribution pattern for the high beam is shaded by the light shielded region 102 as in, for example, the controls 2, 3 and 5 shown in FIG. 3, a main direction of line of sight of the driver during a driving is directed to a central part ahead. Accordingly, when the luminous intensity is increased by the superimposed region 100d in the central part side of the irradiation region, it is possible to improve a feeling of safety for the driver. Similarly, when the light source 14b is turned on, since the reflected light can be superimposed on a given position in the second irradiation region 100b, a similar effect can be obtained. In another exemplary embodiment, an angle or a position of the reflecting portion 106 may be adjusted. In this case, the position of the superimposed region by the reflected light can be changed. Thus, the luminous intensity of an area can be improved so as to meet the needs of the driver.

When the light radiated from the light source 14a or the light source 14b are directly applied to the front part through the projection lens 20, the formed light distribution pattern is the lightest in its central part and gradually darker toward side parts. The form of the light distribution pattern is the mountain shape which gradually hangs toward the side parts and its contour is obscure. When the light sources 14a, 14b are turned on without shielding the light by the movable shade 12, since the overlapping region 100c is formed, an inconvenience does not especially arise. Further, since the form of the end part side which is not the overlapping region 100c does not require strictness, an inconvenience does not arise. However, in the case of the one side high beam in which only the light source 14a or the light source 14b is independently turned on without shielding the light by the movable shade 12 as in the condition 4 or the condition 6 shown in FIG. 3, the light of the area where the light source is turned on enter the area where the light source is turned off. As a result, a part that is actually desired to shield the light is partly light so that a performance for removing a glare is deteriorated and the contour of the end part is unstable.

Figure 5A:
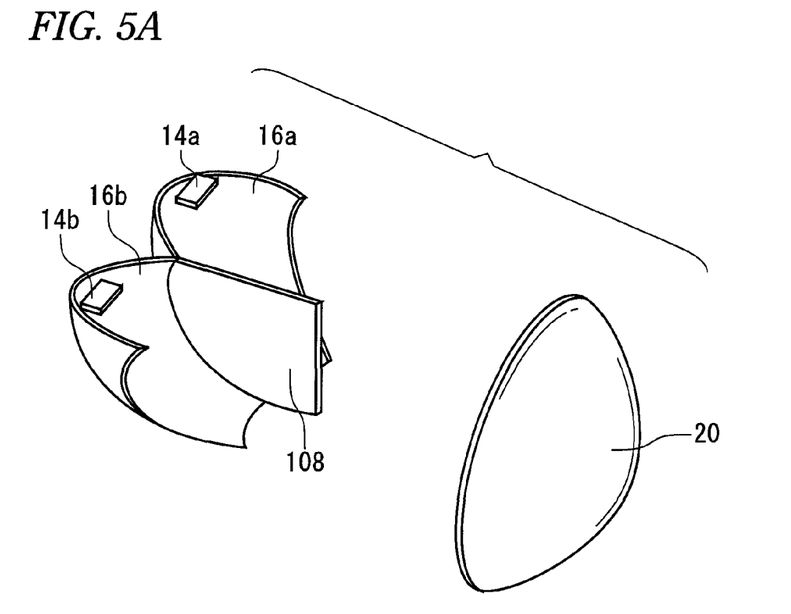
FIG. 5A is a diagram illustrating an example in which a region cutting member is arranged between the first light source and the second light source.
Figure 5B:
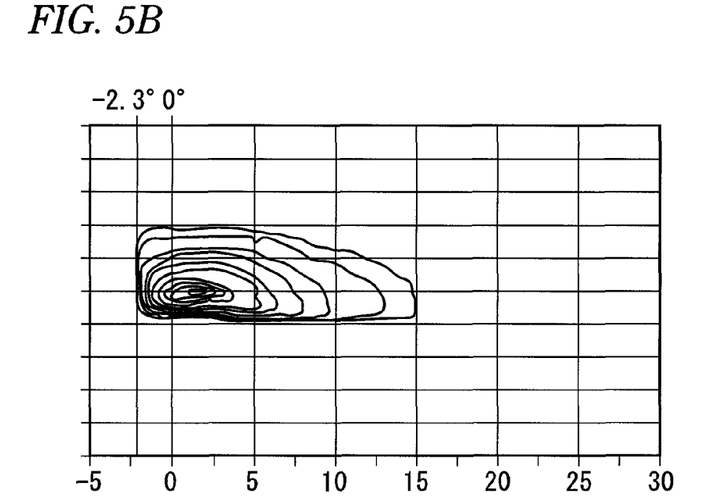
FIG. 5B is a diagram illustrating an iso-illuminance curve of light irradiation according to the optical system of FIG. 5A.

Thus, as shown in FIG. 5A, a region cutting member 108 is provided that is arranged along the direction of an optical axis between the light source 14a and the light source 14b to determine a vertical cut line in an end of the joined region side of the first irradiation region 100a and an end of the joined region side of the second irradiation region 100b. The region cutting member 108 may be a thin plate shaped member to simply form a cut line in the end of the joined region side of the first irradiation region 100a and the end of the joined region side of the second irradiation region 100b. Further, a reflecting member may be provided in a side surface of the region cutting member 108 to guide the light reflected thereon to the first irradiation region 100a or the second irradiation region 100b, superimpose the light thereon and increase the luminous intensity. FIG. 5B shows an example of an iso-illuminance curve when only the light source 14a is turned on. In the case of this example, the end of the joined region side of the first irradiation region 100a is located at a position of 2.3° exceeding 0°, the center of the irradiation region, where the cut line is formed by the region cutting member 108. When the region cutting member 108 is not provided, the end of the joined region side of the first irradiation region 100a exceeds 0° and extends to a position in the vicinity of, for example, 8°. In the end part, the luminous intensity is lowered and the form of the end part includes flap parts. As described above, when the region cutting member 108 is provided, the contour of the end of the joined region side of the first irradiation region 100a can be made to be definite and an irradiation range can be clearly determined. When the light source 14b is turned on, and when both the light sources 14a, 14b are turned on, the same effects can be obtained.

Figure 6A:
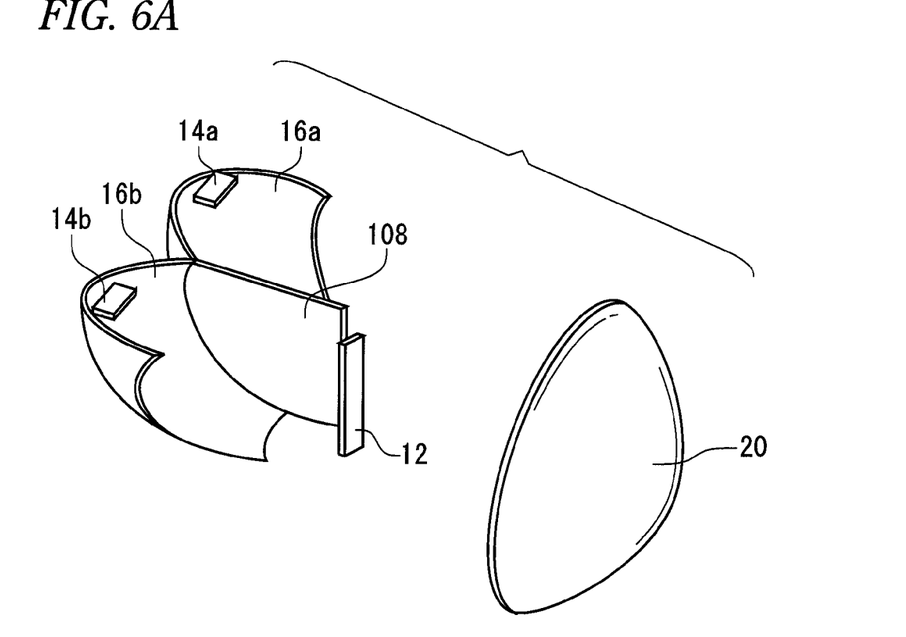
FIG. 6A is a diagram illustrating an example in which the region cutting member and the movable shade are arranged between the first light source and the second light source.
Figure 6B:
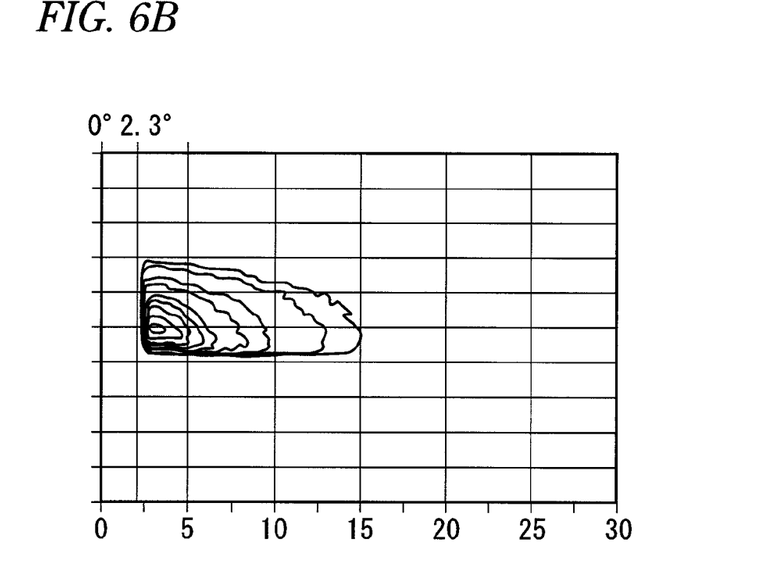
FIG. 6B is a diagram illustrating an iso-illuminance curve of light irradiation according to the optical system of FIG. 6A.

FIG. 6A shows an example in which the movable shade 12 is added to the structure shown in FIG. 5A so as to form the light shielded region 102 in the first irradiation region 100a. In this case, as shown in FIG. 6B, the light distribution pattern corresponding to the control shown in FIG. 3 can be formed. In the case of this example, in the first irradiation region 100a, the cut line is formed at 2.3° from 0°, the center of the irradiation region, by the movable shade 12 and the light is shielded by the region cutting member 108 so that the light is not applied by exceeding 0° as the central part.

Figure 7A:
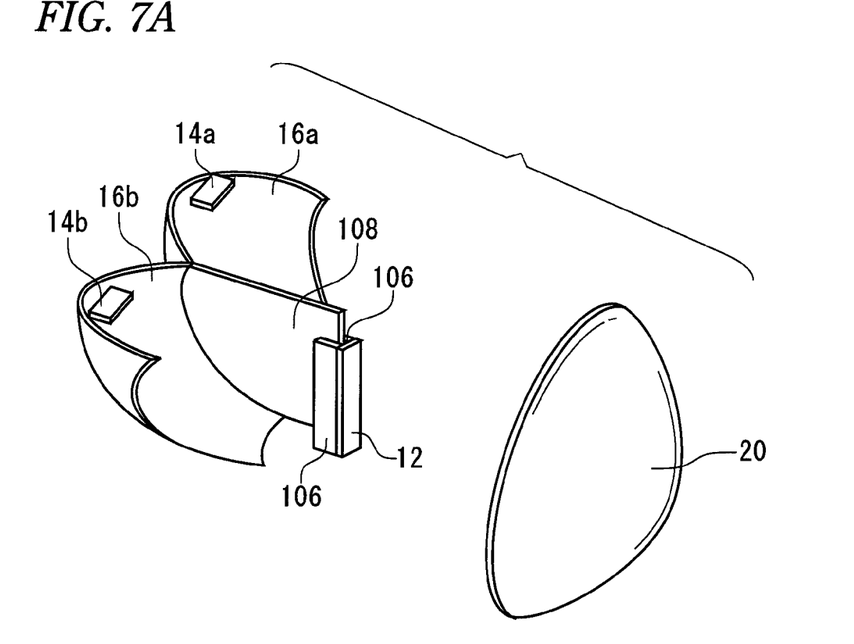
FIG. 7A is a diagram illustrating an example in which the region cutting member and the movable shade are arranged between the first light source and the second light source and a portion of the region cutting member is covered by the reflecting portions of the movable shade.
Figure 7B:
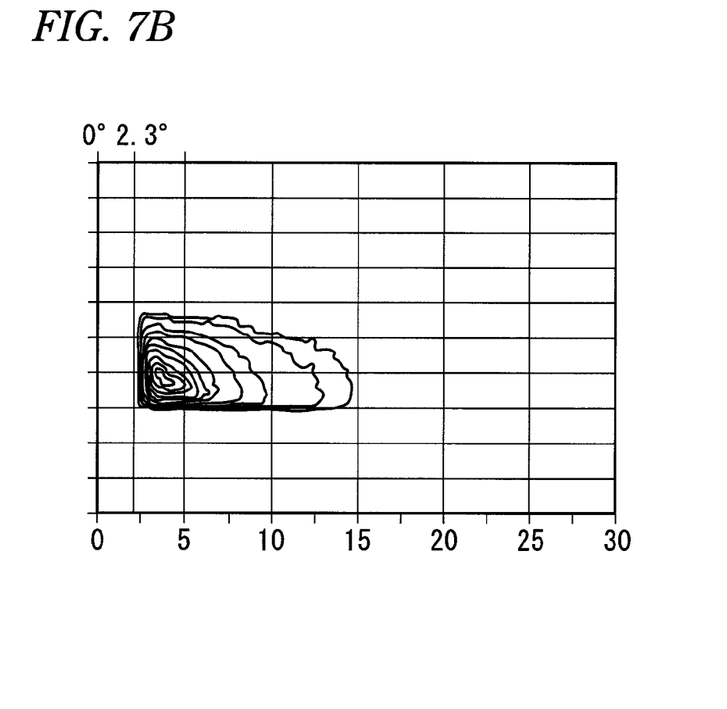
FIG. 7B is a diagram illustrating an iso-illuminance curve of light irradiation according to the optical system of FIG. 7A.

FIG. 7A is a diagram illustrating an example in which the movable shade 12 has the reflecting portions 106 shown in FIG. 4A. In an example shown in FIG. 7A, the reflecting portions 106 are formed on both side surfaces of the movable shade 12 so that a horizontal section has a rectangular C shape. In this case, as shown in FIG. 7B, the light reflected by the reflecting portions 106 is superimposed on a part in the vicinity of the light shielded region 102 shaded by the movable shade 12 to increase the luminous intensity.

In this way, in an optical system including the light source 14a and the light source 14b, the region cutting member 108 and the movable shade 12 having the reflecting portion are provided, so that the light distribution pattern of substantially the same kind as that obtained when the three light source are provided can be formed by the two light sources. As a result, the vehicle headlamp 210 can be easily made to be compact, the cost of parts can be reduced and a control for turning on and off the light sources can be simplified. Further, the decrease of the number of the light sources can contribute to a reduction of a required electric power. Further, the form of the light distribution pattern can be made to be definite and the characteristics of the light distribution pattern can be improved.

In the above-described examples, the high beam headlamp 210 is described. That is, the low beam headlamp is provided separately from the high beam headlamp 210 and the light distribution pattern is combined with the light distribution pattern of the low beam to form the high beam. The control of the high beam of the present exemplary embodiment may be applied to a light distribution variable type headlamp in which the high beam and the low beam can be formed in one vehicle headlamp. In this case, a shade is necessary that is required for forming other light distribution patterns such as the low beam as well as the above-described shade 12. Thus, according to the exemplary embodiment, as shown in FIGS. 8A and 8B, a rotary shade 110 is used that can be rotated on a rotating shaft extending in the vehicle width direction.

Figure 8A:
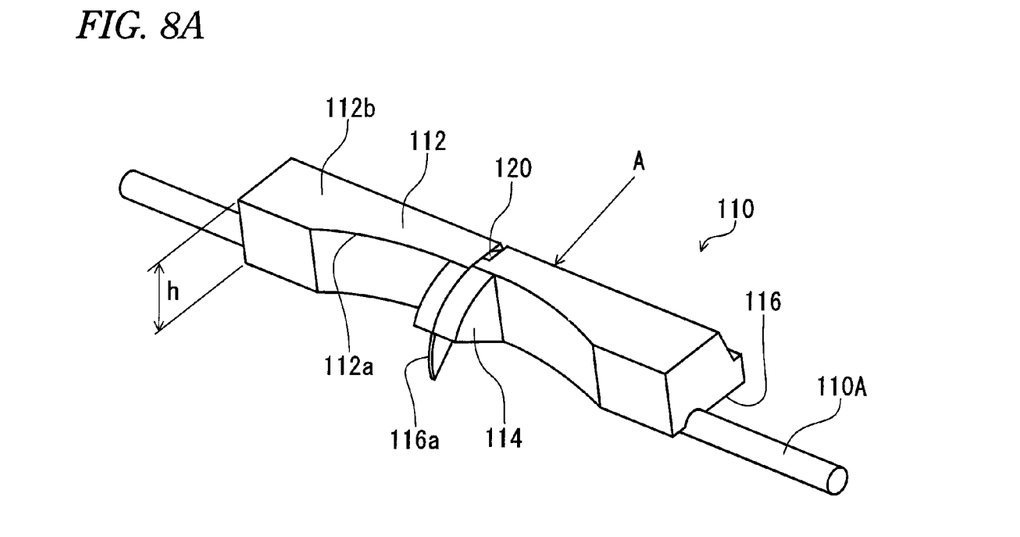
FIG. 8A is a perspective view of a rotary shade of a vehicle headlamp according to another exemplary embodiment of the present invention.
Figure 8B:
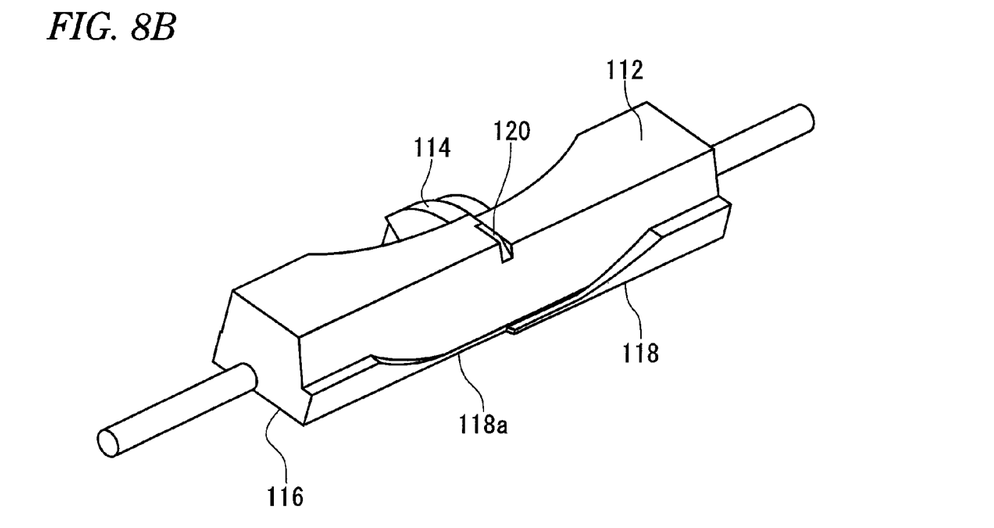
FIG. 8B is another perspective view of the rotary shade.

FIGS. 8A and 8B are perspective views of the same rotary shade 110 seen in different directions. The rotary shade has a rotating shaft 110a supported by a fixed part of the shade mechanism 18, and stopped precisely at certain rotation angles, for example, by driving a motor. The rotary shade 110 shown in FIG. 8A is formed from a rectangular piece as a base material and includes a left-hand traffic low beam shade 112, a central light shielding shade 114, a high beam cutaway surface 116 for a high beam and a right-hand traffic low beam shade 118 respectively on surfaces (four surfaces) in the longitudinal direction. As a basic optical system, for example, the optical system shown in FIG. 7A is used. That is, a first light source system including the light source 14a and the reflector 16a and a second light source system including the light source 14b and the reflector 16b are partitioned by a region cutting member 108. In front of the region cutting member 108, the projection lens 20 is arranged such that the rotary shade 110 including the shade corresponding to the movable shade 12 is disposed between the region cutting member 108 and the projection lens 20.

The left-hand traffic low beam shade 112 and the right-hand traffic low beam shade 118 serve to most shield the light radiated from the light sources 14a, 14b. The left-hand traffic low beam shade 112 and the right-hand traffic low beam shade 118 respectively have shade edges formed at positions spaced by a distance h from the center of the rotating shaft 110a to ensure a light shielded region. The shade edge 112a of the left-hand traffic low beam shade 112 is formed so that when the rotary shade 110 rotates to a rotating position of the left-hand traffic low beam, the shade edge 112a shields the light at a position overlapped on a rear focal plane of the projection lens 20 in order to make the contour of a cut off line clear. Since other shades are mounted on the rotary shade 110 and the rotary shade needs to ensure rigidity or to be easily worked, the rotary shade is formed from a rectangular piece as a base material. Accordingly, in the case of FIG. 8A, under a state that the light of the light source are radiated from a direction shown by an arrow mark A, the shade edge 112a is arranged at the most distant position from the light source in the forming surface of the left-hand traffic low beam shade 112. In this case, a reflecting surface 112b may be formed on a portion of the shade edge 112a in the light source side to effectively use reflected light thereon for forming the low beam.

As described above, according to the exemplary embodiment, the region cutting member 108 is provided that determines the vertical cut line along the end of the joined region side of the light distribution pattern when only the light source 14a or the light source 14b is turned on. The region cutting member 108 is desirably allowed to come close to the shade edge on the rotary shade 110 as much as possible. However, since the left-hand traffic low beam shade 112 has a height from the rotating shaft 110a, the rotary shade 110 may occasionally come into contact with the region cutting member 108 during a rotation. Thus, on the forming surface of the left-hand traffic low beam shade 112 of the rotary shade 110, a cutout groove 120 is formed to avoid an interference with the region cutting member 108 when the rotary shade 110 rotates.

The central light shielding shade 114 functions as a shade for shading a central part like the movable shade 12 shown in FIG. 7A when the light sources 14a, 14b are turned on to have the high beam as described above. A portion of the rotary shade 110 in which the central light shielding shade 114 is formed is largely cut out to form the same irradiation region as the high beam. By the central light shielding shade 114 formed in the central part, the central area shaded state as shown in the condition 2 of FIG. 3 or the one side high beam state as shown in the condition 5 is formed.

The high beam cutaway surface 116 is configured such that one surface of the rotary shade 110 is fixed to the rotating shaft 110a so that the entire portion of the rotary shade 110 on one side of the rotating shaft 110a is substantially cut away. In this case, a distance of the high beam cutaway surface 116 relative to the region cutting member 108 is larger than that of the forming surface of the left-hand traffic low beam shade 112 or the forming surface of the right-hand traffic low beam shade 118 relative thereto. As a result, a space is formed between the high beam cutaway surface 116 and the region cutting member 108. For example, when the one side high beam is formed without shading the central part as shown in the condition 4 or the condition 6 of FIG. 3, the vertical cut line by the region cutting member 108 cannot be occasionally formed. Accordingly, to supplement the space formed between the high beam cutaway surface 116 and the region cutting member 108, a supplementary member 116a substantially continuing to the region cutting member 108 is provided in the high beam cutaway surface 116. In the case of FIG. 8A, the supplementary member 116a is formed so as to continue to a rear surface side (a non light shield surface) of the central light shielding shade 114.

The right-hand traffic low beam shade 118 has the shade edge 118a that forms the light distribution pattern which is reversed right and left to that of the left-hand traffic low beam shade 112.

Figure 9:
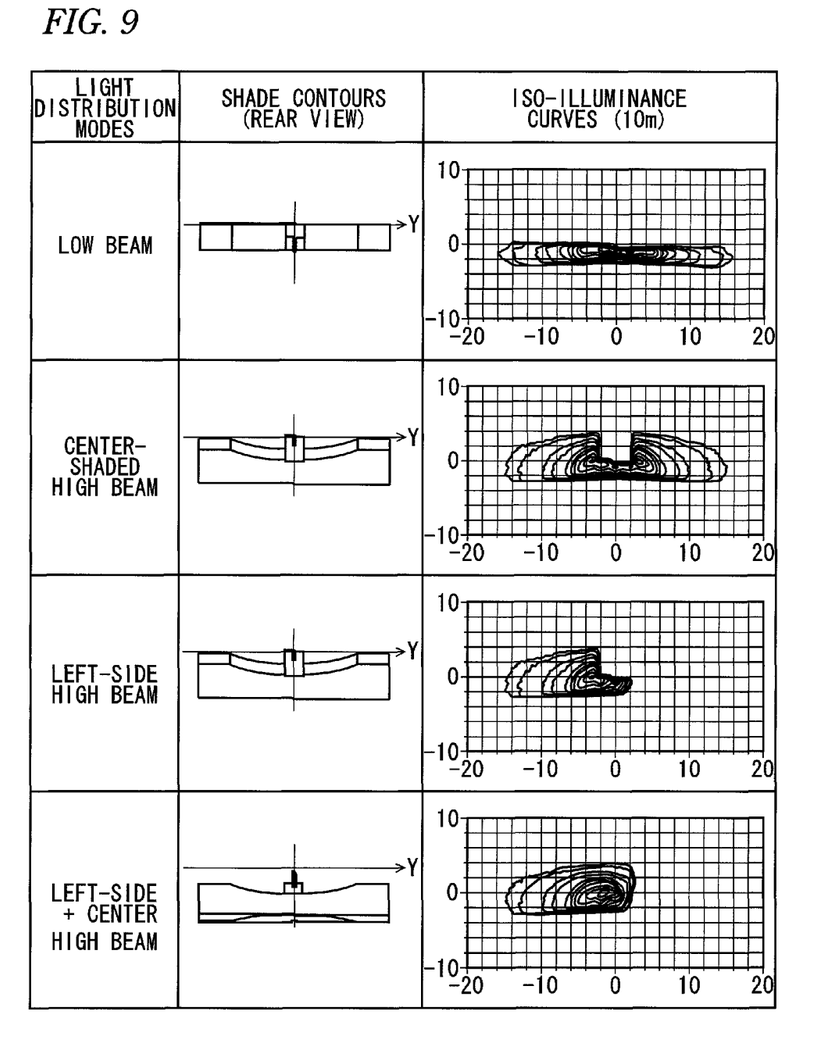
FIG. 9 is a diagram illustrating shade contours and corresponding iso-illuminance curves that can be formed by the rotary shade.
Figure 10:
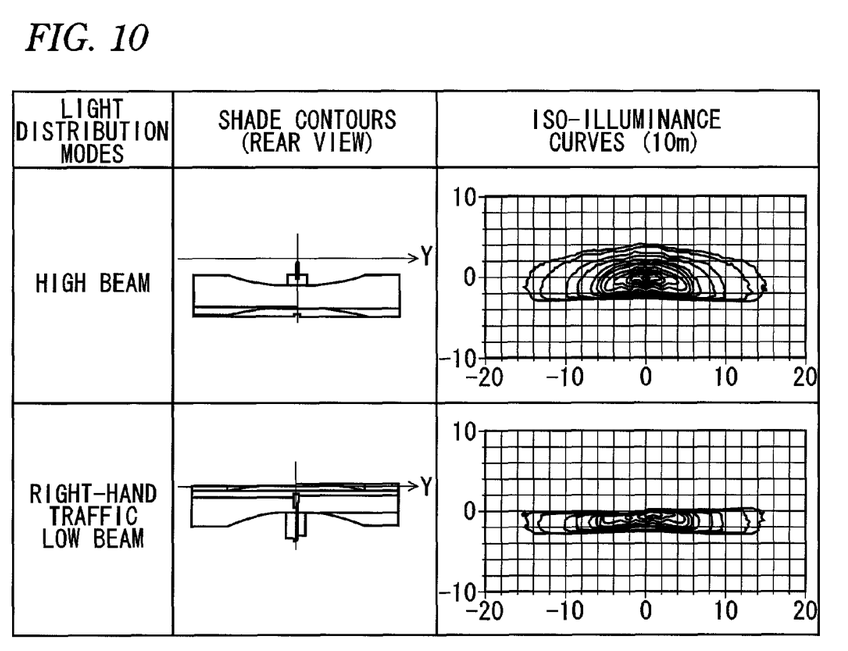
FIG. 10 is another diagram illustrating shade contours and corresponding iso-illuminance curves that can be formed by the rotary shade.

FIGS. 9 and 10 are explanatory views showing the forms of the shades that can be selected by rotating and driving the rotary shade 110 shown in FIGS. 8A and 8B and iso-illuminance curves of the light distribution patterns formed at that time. According to the exemplary embodiment, the decision of the rotating position of the rotary shade 110 and a control for turning on and off the light sources 14a, 14b can be determined in accordance with an operating state of a headlamp changing switch operated by the driver. Further, surrounding conditions, for example, the existence of a preceding vehicle, an oncoming vehicle or a pedestrian may be detected through detecting mean such as a camera mounted on the vehicle or information such as the form or configuration of a road during a travel and geographical features may be obtained from a navigation system to automatically determine and switch to an optimum irradiation condition suitable for the surrounding conditions.

For example, when it is suitable to apply the left-hand traffic low beam in accordance with the surrounding condition, namely, when a light distribution mode is set to the left-hand traffic low beam, the irradiation controller 228 rotates the rotary shade 110 so that the left-hand traffic low beam shade 112 faces an optical path of the light source 14. In this case, both the light sources 14*a*, 14*b* are turned on. At this time, the left-hand traffic low beam shade 112 shades a lower side of a line (a horizontal line Y in FIG. 9) including an optical axis. Since the projection lens 20 is a plano-convex aspheric lens having a convex front surface and a flat rear surface, a light source image formed on a rear focal plane is projected as an inverted image ahead of the vehicle headlamp 210. In the case of the left-hand traffic low beam, since the light sources 14*a*, 14*b* are turned on and the overlapping region 100*c* is formed, as shown in the iso-illuminance curve, the low beam can be provided in which the luminous intensity of a central part is high so that the front part may be easily recognized.

When it is suitable to apply the high beam with the central area shaded in accordance with the present surrounding condition, namely, when the light distribution mode is set to a center-shaded high beam, the irradiation controller 228 rotates the rotary shade 110 so that the central light shielding shade 114 faces the optical path of the light source 14 to shade a portion of the lower side of the line including the optical axis. In this case, both the light sources 14*a*, 14*b* are turned on. In the center-shaded high beam, since the central portion of the high beam is shaded by the central light shielding shade 114, as shown in the iso-illuminance curve, the high beam can be provided in which a consideration is taken so as not to give a glare to an oncoming vehicle or a preceding vehicle present far in front and a visibility of other areas is improved.

Since a vehicle or a pedestrian is present far ahead or in an opposing lane, and a preceding vehicle is not present near in front on a the self lane, it is supposed to be suitable to irradiate only the self lane with the high beam. That is, when the light distribution mode is set to a left-side high beam, the irradiation controller 228 rotates the rotary shade 110 so that the central light shielding shade 114 faces the optical path of the light source 14 to shade a portion of the lower side of the line including the optical axis. In this case, only the right side light source 14*b* is turned on. Since the light source image formed on the rear focal plane of the projection lens 20 is an inverted image, only the left side (the self lane side) in front is irradiated with the left-side high beam. The central portion of the high beam is shaded by the central light shielding shade 114. As a result, as shown in the iso-illuminance curve of the left-side high beam, the high beam can be provided in which a consideration can be taken so as not to give a glare to an oncoming vehicle or a preceding vehicle present far in front and an oncoming vehicle or a pedestrian present near in front on an opposing lane and a visibility of the self lane is improved.

Since a preceding vehicle is not present on a the self lane and a vehicle or a pedestrian is present on an opposing lane, it is supposed to be suitable to irradiate only the self lane with the high beam. That is, when the light distribution mode is set to a left-side+center high beam, the irradiation controller 228 rotates the rotary shade 110 so that the high beam cutaway surface 116 faces the optical path of the light source 14 not to shade an entire portion of the optical path including the lower side of the line having the optical axis. In this case, only the right side light source 14*b* is turned on. Since the light source image formed on the rear focal plane of the projection lens 20 is an inverted image, only the left side (the self lane side) in front is irradiated with the left-side high beam. Since the light is not shielded, as shown in the iso-illuminance curve of the left-side+center high beam, the high beam can be formed in which the central part is an irradiation region in addition to the left-side high beam. As a result, the high beam can be provided in which a consideration is taken so as not to give a glare to the oncoming vehicle or the pedestrian present near in front on the opposing lane and a visibility of the self lane is improved.

Since an object is not present such as a pedestrian or a vehicle for which a glare needs to be considered on a the self lane and an opposing lane, it is supposed to be suitable for apply the high beam. That is, as shown in FIG. 10, when the light distribution mode is set to a high beam, the irradiation controller 228 rotates the rotary shade 110 so that the high beam cutaway surface 116 faces the optical path of the light source 14 not to shade an entire portion of the optical path including the lower side of the line having the optical axis. In this case, the light source 14*a* and the light source 14*b* are turned on. Because the light is not shielded, the overlapping region 100*c* by the light sources 14*a*, 14*b* is also formed. Thus, as shown in the iso-illuminance curve of the high beam, the high beam can be provided in which the luminous intensity of a central part is high so that the front part may be easily recognized.

Further, in a right-hand traffic region, a low beam having a reverse form to the left-hand traffic low beam, that is, a right-hand traffic low beam is necessary. In this case, the irradiation controller 228 rotates the rotary shade 110 so that the right-hand traffic low beam shade 118 faces the optical path of the light source 14. In this case, both the light sources 14*a*, 14*b* are turned on and the right-hand traffic low beam shade 118 shades the lower side of the line including the optical axis. As a result, the right-hand traffic low beam can be formed that has a cut off line of a reverse form to that of the left-hand traffic low beam. Thus, as shown in the iso-illuminance curve of the right-hand traffic low beam, the low beam can be provided in which the luminous intensity of a central part is high so that the front part may be easily recognized.

Figure 11:
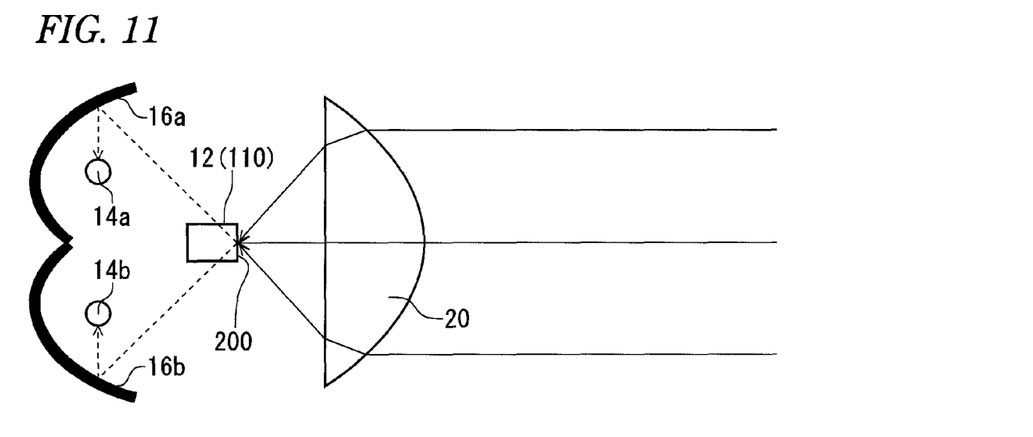
FIG. 11 is a diagram illustrating an example in which the movable shade has a blocking surface configured to block incoming light.

When the projection lens 20 of the vehicle headlamp 210 is exposed to extraneous light such as solar light, for example in the daytime, the solar light is converged on the reflectors 16*a*, 16*b* as shown by broken lines in FIG. 11 raises the temperature of the light sources 14*a*, 14*b* and the peripheries thereof, which may cause a deformation or a failure. If the light sources 14*a*, 14*b* and the components near the light sources 14*a*, 14*b* are configured to improve heat-resistance, a cost will increase and design flexibility will be lowered. Thus, the vehicle headlamp 210 may include, between the projection lens 20 and the movable shade 12 or the rotary shade 110 on the rear focal plane of the projection lens 20, a blocking surface 200 to block the extraneous light incoming through the projection lens 20 toward the light source 14. The blocking surface 200 may be a surface of the movable shade 12 or the rotary shade 110 that has a certain heat resistance. For example, in a case in which the headlamp 210 is configured as a high beam headlamp and the movable shade 12 is configured to have the blocking surface 200, the movable shade 12 is moved to the light shield position as shown in FIG. 11 when the light sources 14*a*, 14*b* are not required to be turned on. This position may be set as a standard position of the movable shade 12 during the daytime or when the light sources are not tuned on. As a result, as shown by a solid line in FIG. 11, the extraneous light is partially blocked by the movable shade 12 to suppress the temperature increase on the light source side. Accordingly, the light sources 14*a*, 14*b* and the components near the light sources 14*a*, 14*b* may be made using a resin material that has relatively low heat resistance. Consequently, the component cost can be reduced and a degree of freedom in selection of the components can be improved. When the rotary shade 110 as shown in FIG. 8 is used, as the standard position in the daytime or during the turning off state of the light source, the central light shielding shade 114 may be located on the optical path of the light source 14. In this case, the extraneous light can be blocked by, for example, a forming surface of the central light shielding shade 114 of the rotary shade 110. Thus, the convergence of the extraneous light on the light source 14 can be reduced and a similar effect can be obtained. The blocking surface 200 may be a non-reflecting surface or a reflecting surface.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

What is claimed is:

1. A vehicle headlamp comprising:
   a projection lens;
   a first light source configured and arranged such that first light from the first light source is forwardly projected through the projection lens to form a first irradiation region;
   a second light source configured and arranged such that second light from the second light source is forwardly projected through the projection lens to form a second irradiation region, wherein the first irradiation region and the second irradiation region are joined to extend in a transverse direction with respect to an optical axis of the vehicle headlamp;
   a movable shade configured to move between a position at which light irradiation to a joined region where the first irradiation region and the second irradiation region are joined is shielded, and a position at which the light irradiation to the joined region is permitted; and
   a controller configured to select one of light distribution patterns that are determined by combinations of turning on and off of the first light source, turning on and off of the second light source, and the positions of the movable shade.

2. The vehicle headlamp according to claim 1, wherein the movable shade comprises a reflecting portion on a side surface thereof to guide a portion of at least one of the first light and the second light the light incident on the reflecting portion to at least one of the first irradiation region and the second irradiation region.

3. The vehicle headlamp according to claim 2, further comprising a region cutting member arranged along a direction of the optical axis between the first light source and the second light source to define a vertical cut line of the first irradiation region on a side of the joined region and a vertical cut line of the second irradiation region on a side of the joined region,
   wherein the reflecting portion of the movable shade covers at least a portion of a front portion of the region cutting member.

4. The vehicle headlamp according to claim 1, further comprising a region cutting member arranged along a direction of the optical axis between the first light source and the second light source to define a vertical cut line of the first irradiation region on a side of the joined region and a vertical cut line of the second irradiation region on a side of the joined region.

5. The vehicle headlamp according to claim 1, further comprising a rotary shade, wherein the rotary shade comprises a plurality of edged shade sections on a circumference of the rotary shade, each of the edged shade sections extending in the transverse direction to shade at least a portion of at least one of the first irradiation region and the second irradiation region,
   wherein the movable shade is formed on a portion of the rotary shade, and
   the movable shade and the edged shade sections are configured and arranged such that a light-shielding condition is changed in accordance with a rotation of the rotary shade.

6. The vehicle headlamp according to claim 1, wherein the movable shade comprises a blocking surface on a side facing the projection lens, wherein the blocking surface is configured to block extraneous light incoming through the projection lens from reaching the first light source and the second light source.

* * * * *